United States Patent [19]

Thomas

[11] Patent Number: 4,858,332

[45] Date of Patent: Aug. 22, 1989

[54] LOFT-LIE TESTER FOR GOLF CLUBS

[75] Inventor: Frank Thomas, Chester, N.J.

[73] Assignee: United States Golf Association, Far Hills, N.J.

[21] Appl. No.: 246,266

[22] Filed: Sep. 19, 1988

[51] Int. Cl.$^4$ .................................................. G01B 5/00
[52] U.S. Cl. ....................................... 33/508; 33/534; 33/1 N
[58] Field of Search ................. 33/508, 534, 538, 1 N; 72/293; 273/32 R, 32 B

[56] References Cited

U.S. PATENT DOCUMENTS

| | | | |
|---|---|---|---|
| 2,973,581 | 3/1961 | Rhodehamel | 33/508 |
| 3,293,762 | 12/1966 | Solheim | 33/508 |
| 3,439,429 | 4/1969 | Sundstrom | 33/508 |
| 3,822,477 | 7/1974 | Collins | 33/508 |
| 4,094,072 | 6/1978 | Erb | 33/508 |
| 4,622,836 | 11/1986 | Lon et al. | 33/508 |
| 4,640,017 | 2/1987 | Cukon | 33/508 |

FOREIGN PATENT DOCUMENTS

| | | | |
|---|---|---|---|
| 0002626 | 1/1977 | Japan | 33/508 |
| 2197493 | 5/1988 | United Kingdom | 33/508 |

Primary Examiner—William A. Cuchlinski, Jr.
Assistant Examiner—Thomas B. Will
Attorney, Agent, or Firm—Kenyon & Kenyon

[57] ABSTRACT

The tester for measuring the loft and lie of a matched set of irons includes a pair of holding units having jaws which mount each club of the set on a fixed common axis. The fixed axis is used as a reference axis in order to measure the lie and loft of a mounted club. The face progression of each club may also be obtained at the time that the loft and lie of the club is obtained.

25 Claims, 4 Drawing Sheets

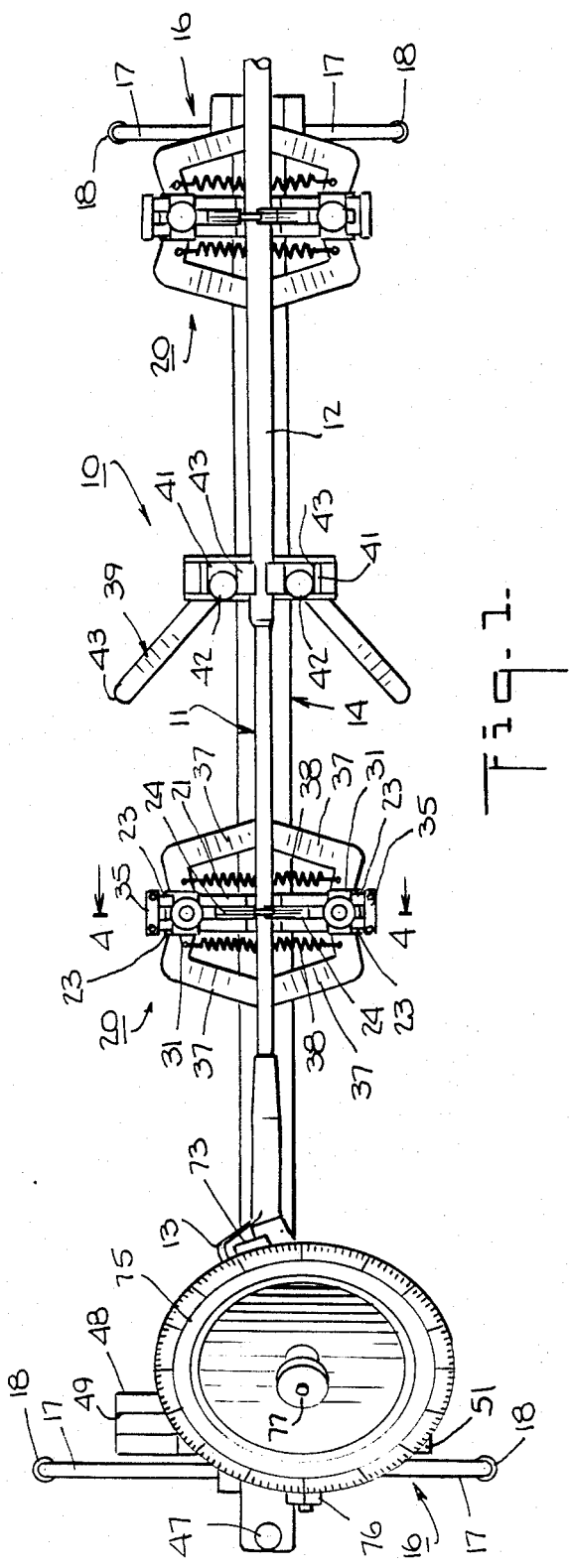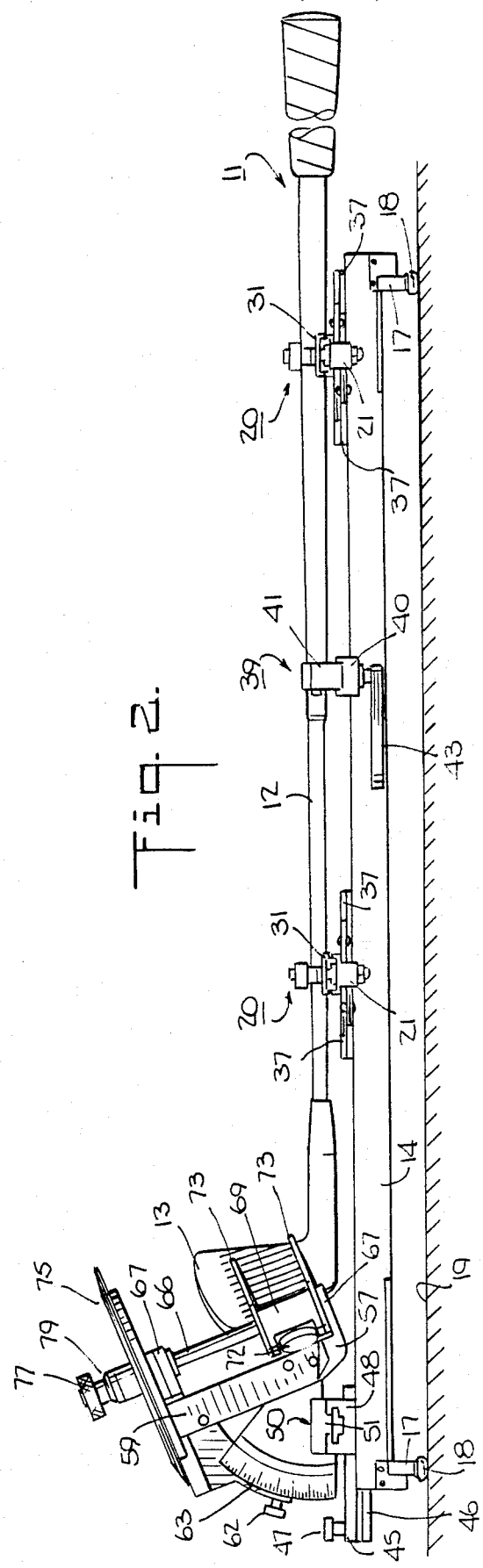

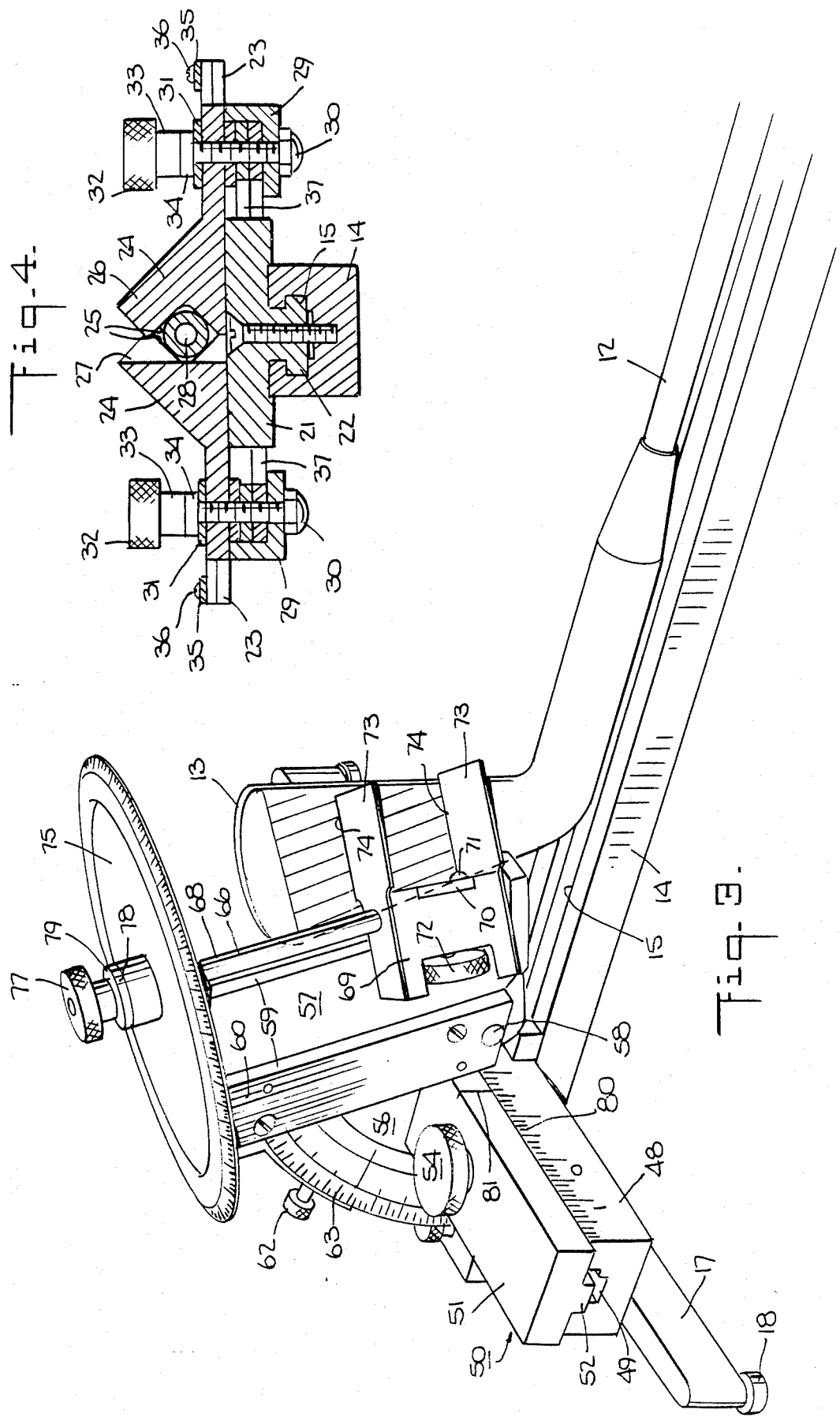

LOFT-LIE TESTER FOR GOLF CLUBS

This invention relates to a loft-lie tester for golf clubs. More particularly, this invention relates to a loft-lie tester for a matched set of irons.

As is known, golf clubs, and particularly, sets of matched irons are usually constructed in accordance with certain design specifications. For example, in the case of iron clubs, the head of each club of a matched set is constructed to have a certain loft, lie and face progression. As described in Maltby, R. "What is Loft and Lie", Ref. Golf Club Design, Fitting, and Alteration, Chapter 44 of "loft" is defined as the angle of the face to the centerline of the hosel hole and is measured differently from that of a wood club. "Lie" is defined as the angle of the centerline of the shaft with the ground line tangent to the sole of the club head at the face centerline. "Face progression" is the distance from the lower edge of the front face of a club head to the axis of the shaft.

In the past, various types of devices have been known for the measuring and testing of the loft and lie of golf club heads. For example, U.S. Pat. No. 4,245,392 describes a device for measuring and adjusting the lie and face of a wood golf club while U.S. Pat. No. 2,973,581 describes a golf club calibration device for irons. Other adjusting mechanisms have also been known for adjusting the lie and loft angles of golf clubs, such as described in U.S. Pat. No. 4,549,357 while other devices., such as described in U.S. Pat. Nos. 4,549,357; 4,094,072; 3,822,477; 3,439,429; 3,208,150 and 3,293,762, have been known for measuring the loft and/or lie of a golf club. Loft and lie machines have also been known which employ a magnetic protractor to obtain the loft angle of a club.

However, the various devices described in the above-noted patents have generally been of cumbersome nature have not been particularly accurate for measuring the loft and lie angles of each iron of a set of matched irons due, in part, to the differences in shaft diameter and lengths of the individual irons. Further, some of these devices have been able to measure only the lie angle or the loft angle but not both angles. Also, in some cases, the devices have been somewhat difficult to use.

Accordingly, it is an object of the invention to provide a tester of simple construction which can be used for measuring the loft and lie of a golf club head of the iron type.

It is another object of the invention to be able to measure the loft and lie of a golf club without undue clamping of the golf club.

It is another object of the invention to obtain precise measurements of loft and lie of each golf club of a set of matched irons in a simple, reliable and rapid manner.

It is another object of the invention to measure the loft, lie and face progression of a golf club head in a reliable manner With a single instrument.

Briefly, the invention provides a tester for a golf club of the iron type which includes an elongated frame and means for holding a shaft of a golf club on the frame with an axis of the shaft disposed on a fixed axis defined by the tester. In addition, the tester includes a clamping means on the elongated frame for clamping a golf shaft along the fixed axis against rotation.

The tester is provided with one assembly which is slidably mounted on the elongated frame for measuring the "lie" of a head of a golf club held on the frame and a second assembly mounted on the first assembly for measuring the "loft" of the head of the golf club which is held in the frame.

The elongated frame is of slender construction and is provided with legs which are pivotable so as to move between a retracted position in parallel relation with the frame and an extended position perpendicular to the frame. As such, the frame can be readily transported from place to place with the lD legs in the retracted position.

The means for holding a shaft of a golf club on the frame includes a pair of holding units each of which includes a pair of jaws disposed in facing relation and spring means biasing the jaws towards each other for holding the golf club shaft in rotatable manner about a fixed axis. Each jaw defines a right-angled recess for receiving a club shaft in two-point relation and is provided with suitable finger grips in order to permit moving apart of the jaws for release of a golf club shaft. Each holding unit is also slidably mounted within the frame of the tester so as to be adjusted to the length of a shaft being tested.

The assembly for measuring the "lie" of the head of a golf shaft includes a block which is pivotally mounted on an axis transverse to the fixed axis provided by the holding means of the tester. This block includes a flat surface for abutting a sole of a golf club head tangentially at a centerline of the face of the golf club head. A scale means is also provided for measuring the angle between the flat surface of the block and the fixed axis as the "lie" of the golf club head. In this respect, with a golf club shaft held and clamped on the frame of the tester, the "lie" measuring assembly is slid along the frame until the block abuts the sole of the golf club head. At that time, the block is pivoted over a small angular displacement while the assembly is slid slightly backwards or forwards so as to bring the flat surface of the block into tangential relation with the club head at the centerline of the face of the club head. This manipulation is performed manually.

In order to obtain a direct measurement of the lie of the golf club, the scale means includes a stationary transparent scale having angular indicia thereon and an indicator which is mounted on an arm which extends from the block for movement therewith and for movement along the scale in order to indicate the angular position of the flat surface of the block relative to the fixed axis on which the golf club shaft is mounted. A means is also provided for releasably locking the block in a fixed angular position relative to the fixed axis so that the angle of lie can be observed.

In order to measure the "face progression" of the club head, the block for measuring the lie is mounted on a slide assembly for movement transverse to the fixed axis of the tester and the elongated frame in order to permit abutment of the sole of the golf club head against a side of the block. In addition, a scale means is provided on the slide assembly to measure the distance between the side of the block and the fixed axis on which the shaft is mounted as a measure of the "face progression" of the golf club. In use, for example, after the lie of the golf club has been measured, and with the golf club clamped in place, the block is moved transversely away from the club head. Thereafter, the assembly on which the block is mounted is moved forwardly past the lower edge of the golf club head until this edge (sole) can be abutted against the side of the block. At this time, this slide assembly is slid towards the golf club until the lower edge abuts the side of the block. The scale means on the slide assembly can then be observed to determine the face progression of the club head. In this respect, the scale is such so that for a zero reading, the side of the block is disposed on the centerline of the elongated frame, that is, on the fixed axis defined by the holding units of the tester.

The assembly for measuring the "loft" of the golf club head is mounted on the assembly for measurement of the lie of the golf club head and is movable therewith. In addition, the loft-measuring assembly includes a rotatable shaft and a pair of plates which are mounted on the shaft in longitudinally spaced parallel relation and in perpendicular relation to the shaft. Each plate also has an edge for abutting the face of a club head While a scale means is provided to measure the angular movement of the shaft from a position with the plate edges in a plane parallel with the fixed axis defined by the holding units of the tester to a position with the plate edges abutting the golf club head face in parallel relation as the "loft" of the golf club head. The scale means is in the form of a circular disc which is secured to the shaft for rotation therewith and has angular indicia thereon as well as an indicator on the assembly in alignment with the shaft.

In order to obtain the loft angle of a golf club head, the assembly is slid along the elongated frame in a direction away from the golf club head until the shaft of the loft measuring means can be rotated so as to bring the plates into abutment with the club face. The shaft is then rotated until the edges of the plate abut the club head and, at that time, the angle on the circular disc can be read as the measurement of the loft of the club head.

The tester is of relatively simple construction and can be readily transported from place to place. In this regard, the means for measuring the loft and the lie of a golf club can be slidably removed from the elongated frame so as to be transported separately. Further, the leg units of the frame can be collapsed into a retracted position to limit the overall contour of the frame.

These and other objects and advantages of the invention will become more apparent from the following detailed description taken in conjunction with the accompanying drawings wherein:

FIG. 1 illustrates a top view of a tester constructed in accordance with the invention;

FIG. 2 illustrates a side view of the tester of FIG. 1;

FIG. 3 illustrates a part perspective view of the means on the tester for measuring the loft of a golf club;

FIG. 4 illustrates a view taken on line IV—IV of FIG. 1;

Figure 5:
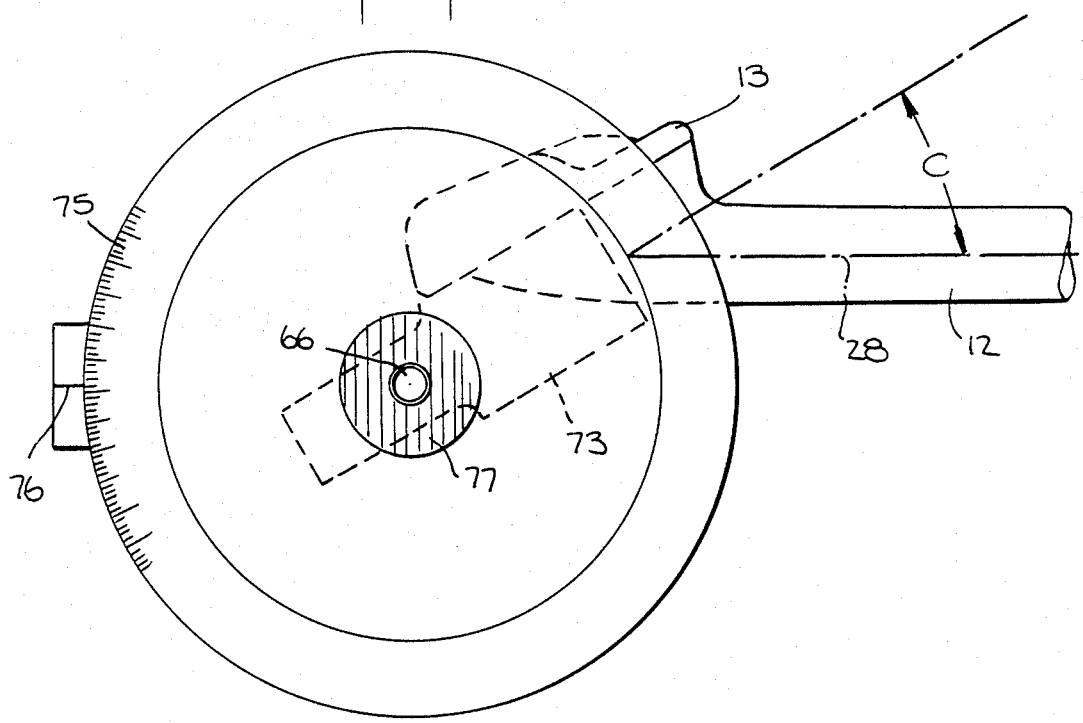
FIG. 5 illustrates a plan view of the means for measuring the loft of a golf club head.

Referring to FIG. 1, the tester 10 is constructed to measure the loft, lie and face progression of a golf club 11 of the iron type, that is, irons having a designation from 1 to 9 as well as sand wedges and pitching wedges. In the illustrated embodiment, the golf club 11 will be designated a 3 iron.

Referring to FIG. 2, the golf club 11 includes a shaft 12 and a golf club head 13 of conventional structure.

Referring to FIGS. 1 and 2, the tester 10 includes an elongated frame 14, for example of aluminum, which is of a length sufficient to receive and support each club of a matched set of clubs individually in a stable manner and which is provided with an inverted T-shaped slot 15 (see FIG. 4). In addition, the frame 14 carries a leg unit 16 at each end, which includes a pair of legs 17 which are mounted on opposite sides of the frame 14 so as to be movable between a retracted position parallel to the frame and an extended position perpendicular to the frame. When in the extended positions, as indicated in FIG. 1, the leg units 16 provide stability to the frame 14. When collapsed into the retracted positions, the leg units 16 permit ready transport of the tester 10.

Each leg 17 also carries a foot 18, for example of rubber or plastic for seating of the tester 10 on a flat surface 19 (see FIG. 2).

The tester also has a means in the form of a pair of holding units 20 for holding the shaft 12 in place. Each holding unit 20 is slidably mounted on the frame 14, and as indicated in FIGS. 1 and 4, has a cross piece 21 which carries a depending T-shaped stem 22 at a central point for sliding within the slot 15 of the frame 14 (see FIG. 4). The cross piece 21 also has a pair of rails 23 extending from each end transversely of the frame 14.

Each holding unit 20 also includes a pair of jaws 24 which are slidably mounted in facing relation within the rails 23 for movement transverse to the frame 14. Each jaw 24 is shaped to provide a right-angled recess 25 in order to receive the golf club shaft 12 in two-point contact relation. To this end, one jaw 24 has a pair of reduced thickness flanges 26 while the other jaw 24 has a centrally disposed slot 27 to receive the flanges 26 in recessed manner. As indicated in FIG. 4, the jaws 24 operate to hold the shaft 11 in a rotatable manner about a fixed axis 28 which is common to all the shafts of a matched set of clubs.

Each holding unit 20 also has a holder 29 secured to the underside of a mounting block 24 by means of a threaded screw 30 which passes upwardly through the holder 29 and jaw 24. In addition, a channel-shaped clamping plate 31 is disposed across the crosspiece 21 and has an opening through which the screw 30 extends. A knurled nut 32 is threadably mounted on the screw 30 with a spring washer 33 and locking washer 34 therebetween. By tightening of the nut 32, the respective jaw 24 is clamped between the clamping plate 31 and the rails 23 of the cross piece 21 and locked in place.

As indicated in FIG. 1, a pair of stops 35 are mounted at opposite ends of the cross piece 21 via a pair of screws 36 in order to limit outward movement of the respective jaw 24.

A biasing means is also provided for biasing the jaws 24 towards each other. This biasing means includes a pair of L-shaped levers 37 which are pivotally mounted about the screw 30 within a respective holder 29. Each lever 37 of a given pair is also pivotally connected at the opposite end to a pivot (not shown) which is fixed to a slide block (not shown) which slides within the slot 15 of the frame 14. In addition, a compression spring 38 is secured between and to an opposite pair of levers 37 so as to bias the levers 37 and, thus, the jaws 24 towards each other.

In order to open a holding unit 20, the knurled nuts 32 are manually grasped and, after loosening, are moved apart. This causes the jaws 24 to open so that the shaft of a golf club can be put in place. Thereafter, the nuts 32 are released so that the jaws 24 entrap and hold the shaft 11 on the fixed axis 28 of the tester 10. The nuts 32 can then be threaded into a locked position to protect against inadvertent opening of a holding unit 20.

Referring to FIG. 1, the tester 10 is also provided with a clamping means 39 which is slidably mounted on the frame 14 for clamping the golf club shaft 11 against rotation. This clamping means 39 includes a cross piece 40 which has a depending T-shaped central piece for slidably mounting the cross piece 40 in the slot 15 of the frame 14. The cross piece 40 also has a channel extending transversely of the frame 14 to receive a pair of slidable mounting blocks 41. Each mounting block 41 includes a V-shaped recess (not shown) facing the other block 41 in order to clamp the shaft 11 therebetween. In addition, a cam 42 is mounted within a recess 43 of each mounting block 41 for rotation about an axis defined by a shaft (not shown) which passes through the mounting block 41 and cross piece 40. A lever 43 is fixedly secured at the bottom end of the shaft of the cam 42 so as to provide for rotation of the cam 42. In this respect, upon pivoting of a lever 43 from a position parallel to the frame 14, the associated cam 42 causes the associated mounting block 41 to move from an open position into a closed position against the golf club shaft 11. Simultaneous movement of the two levers 43 causes the mounting blocks 41 to lock the shaft in a non-rotatable manner about the fixed axis 28 (see FIG. 4).

Figure 6:
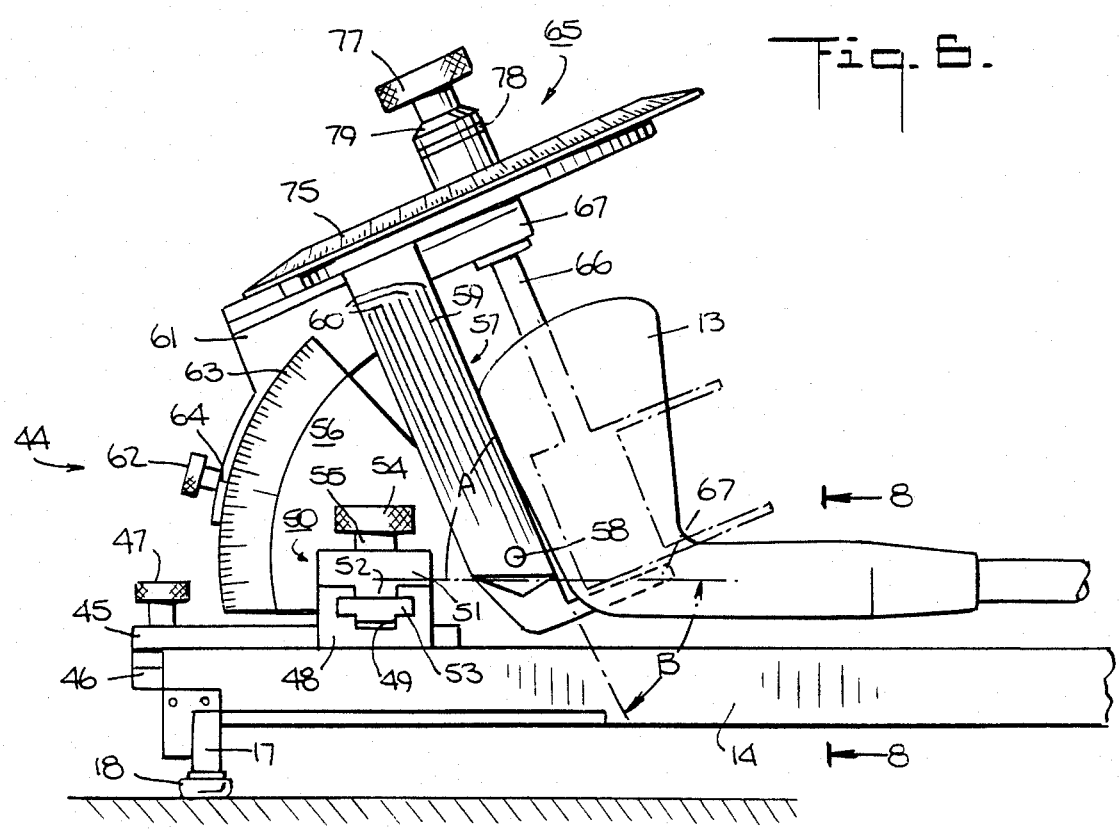
FIG. 6 illustrates a side view of a means to measure the lie of a golf club head.

Referring to FIG. 6, an assembly 44 is slidably mounted on the frame 14 for measuring the "lie" of the head 13 of the golf club which is held on the frame 14. This assembly 44 includes a slide assembly formed by a T-shaped bar 45 which is slidably received in the slot 15 of the frame 14 (see FIG. 7) and a clamping plate 46 which is of rectangular cross sectional shape and which is received within the slot 15 of the frame 14. A clamping screw 47 is rotatably mounted at one end of the bar 45 and passes through the bar 45 into threaded engagement with the clamping plate 46. Upon threading of the screw 47 against the bar 45, the clamping plate 46 is drawn into engagement the bar 45 so as to clamp the entire assembly 44 to the frame 14.

The slide assembly includes a block 48 which is carried on and extends transversely Of the bar 45 and frame 14. This block 48 includes an elongated slot 49 of cruciform shape which receives a second slide assembly 50.

The slide assembly 50 includes a cross piece 51 which has a depending central stem 52 which is slidably received in a top part of the slot 49 of the block 48 as well as a clamping plate 53 of T-shaped cross-section which is received within the remainder of the slot 49. In addition, a pair of clamping screws 54 each having a knurled head pass through a washer 55 and the cross piece 51 into threaded relation with the clamping plate 53. Upon threading of each screw 54 into the clamping plate 53, the slide assembly 50 is clamped to the block 48.

As indicated in FIG. 3, the slide assembly 50 is mounted for movement transverse to the fixed axis 28 of the tester 10 and, thus, the axis of the club shaft 12.

The cross piece 51 carries a block 56 having the shape of an arcuate segment at a central point on which a measuring block 57 is pivotally mounted via a pivot pin 58 disposed on an axis transverse to the fixed axis 28 (see FIG. 6). The block 57, in turn, carries a pair of wear plates 59, one On each side, each of which is provided with a plurality of parallel grooves 60 on the outside face and which are co-planar with a flat face of the block 57. The block 57 also carries an arcuate shaped arm 61 which extends rearwardly and which faces a curved surface of the arcuate block 56. A locking screw 62 is threaded through the arm 61 to engage the surface of the arcuate block 56 in order to lock the arm 61 and, thus, the pivotal block 57 in a fixed position.

The actuate block 56 carries a scale means in the form of a pair of transparent plates 63 on opposite sides, each of which is marked with angular indicia to cooperate with an indicator 64 on the arm 61 to indicate the angular relationship of the block 57 to the fixed axis 28 (see FIG. 6).

The scale plates 63 are such that with the pivotal block 57 in a vertical position, the indicator 64 indicates an angle of 90°.

Referring to FIGS. 3 and 6, a second assembly 65 is mounted on the slidable assembly 44 for measuring the "loft" of the golf club head 13. This assembly 65 includes a rotatable shaft 66 which is mounted in two flange extensions 67 of the pivotally mounted block 57 so as to move therewith. The shaft 66, as indicated in FIG. 3, has a longitudinal aligning slot 68 and carries a mounting block 69 in slidable relation. The block 69 has a through bore (not shown) to accommodate the shaft 66 as well as a clamping plate 70 which is carried in a recess on one side of the block 69 via a pair of screws 71. This clamping plate 69 includes a depending stem (not shown) which fits into the slot 68 of the shaft 66 as well as a clamping screw 72 which is threaded into the opposite side of the block 69 for engaging the shaft 66. In addition, the block carries a pair of plates 73 which are disposed in longitudinally spaced parallel relation relative to the shaft 66 as well as in perpendicular relation to the shaft 66. Each plate 73 has a pair of edges 74 on opposite sides for abutting face of a club head 13. For example, one edge 74 of a plate 73 is used to abut the face of a right-hand golf club while the opposite edge is used to abut the face of a left-hand golf club.

The measuring assembly 65 also includes a scale means in the form of a circular disc 75 for measuring the angular movement of the shaft 66. To this end, the disc 75 is secured to the shaft 66 for rotation therewith and has angular indicia thereon to cooperate with an indicator 76 (see FIG. 5) on an upper surface of the arm 61. In this respect, separate structural pieces may be disposed between the arm 61 and the disc 75 in order to provide for the positioning of the indicator 76.

The indicia of the disc 75 are disposed so as to measure the angular movement of the shaft 66 from a position with the plate edges 74 on one side in a plane parallel with the fixed axis 28 to a position with the plate edges 74 abutting the club head face 13 in parallel relation.

Referring to FIG. 3, the shaft 66 has a threaded end which extends through the disc 75 and receives a threaded nut 77 which abuts against a spring washer 78 and locking washer 79 in order to secure the shaft 66 in a fixed position.

Referring to FIG. 3, the cross piece 48 of the slide assembly 44 is provided with indicia 80 to measure the face progression of a golf club head 13. In this respect, an indicator 81 is provided on the cross piece 51 of the slide assembly 50 which corresponds to a position of the face of the wear plate 59 facing the club head 13 being in alignment with the fixed axis 28 (see FIG. 8). In addition, the indicia 80 have a zero position corresponding to this side of the wear plate 59 being aligned with the fixed axis 28. Thus, any deviation of the indicator 81 form the zero position indicates the amount of the face progression for right-hand club head 13.

The face progression for a left-hand club head is obtained in similar fashion by providing indicia and indicators on the block 48 and cross piece 51 in opposite relation relative to the left-hand wear plate 59 on the pivotal block 57.

In order to measure the lie, loft and face progression of a each club of a matched set of right-hand irons, a selected club 11 is mounted in the holding units 20 as described above. Thereafter, the clamp means 37 is moved into the clamping position to hold the club 11 in place. At this time, the head 13 of the club 11 is in an upright position and the axis of the shaft 12 is disposed on the fixed axis 28 provided by the holding units 20.

Next, referring to FIG. 6, the assembly 44 is slid towards the club head 13 until the right-hand wear plates 59 on the mounting block 57 comes into a tangential position with the sole of the club head 13. At this time, the screw 62 is turned to lock the block 57 in place and a reading of the angle indicated by the indicator 64 is made as the "lie". These manipulations maybe carried out on the side of the frame 14 opposite to the loft measuring plate 73 to provide a full view of the sole of the club head 13.

For a standard lie, for example for a 3 iron, the pivotal block 57 should be pivoted into a position so that the indicator 64 is disposed at the 57° mark on the scale Alternatively, the block 57 may be set into the standard lie angle for a club and then slid against the sole of the club head. If the block 57 is then tangent to the head 13 at the centerline of the club head face, the club head 13 has a standard lie. If not, the deviation can be measured by loosening the screw 62 and adjusting the block 57 into tangential relation with the sole of the club head 13.

As indicated in FIG. 6, the interior angle A between the face of the block 57 and the fixed axis 28 is complementary to the lie angle of the club head 13 and thus is a measurement of the lie angle B.

In order to measure the loft of the golf club 11, the screw 47 of the slide assembly 44 is loosened to permit the assembly to be slid rearwardly in order to bring the plates 73 into a position for movement against the face of the club head 13. The screw 47 is then tightened to lock the slide assembly 44 to the frame 14 and the clamping screws 54 of the slide assembly 50 are loosened so as to permit the slide assembly 50 to be moved towards the club head 13 in order to bring the plates 73 near the club head 13. These screws 54 are then tightened and the plates 73 are moved, for example, manually, against the face of the club head 13. With the edges 74 of the plates 73 in parallel abutting relation to the face of the club head 13, as shown in FIGS. 3 and 5, the locking nut 77 is turned to clamp the disc 75 in place. The angle indicated by the indicator 76 is a measure of the "loft" of the club head 13 (see FIG. 5). For example, for a 3 iron, a standard loft angle is 24°. If this angle is not obtained, then the loft is not standard.

If there is a deviation from the standard loft, the actual loft angle can be measured by loosening the clamping nut 77 and rotating the plates 73 into parallel abutting relation to the club head face. The actual angle C can then be read off the disc 75.

Should the plates 73 not be in parallel contact with the face of a club head 13, then the loft of the club is not standard.

Figure 7:
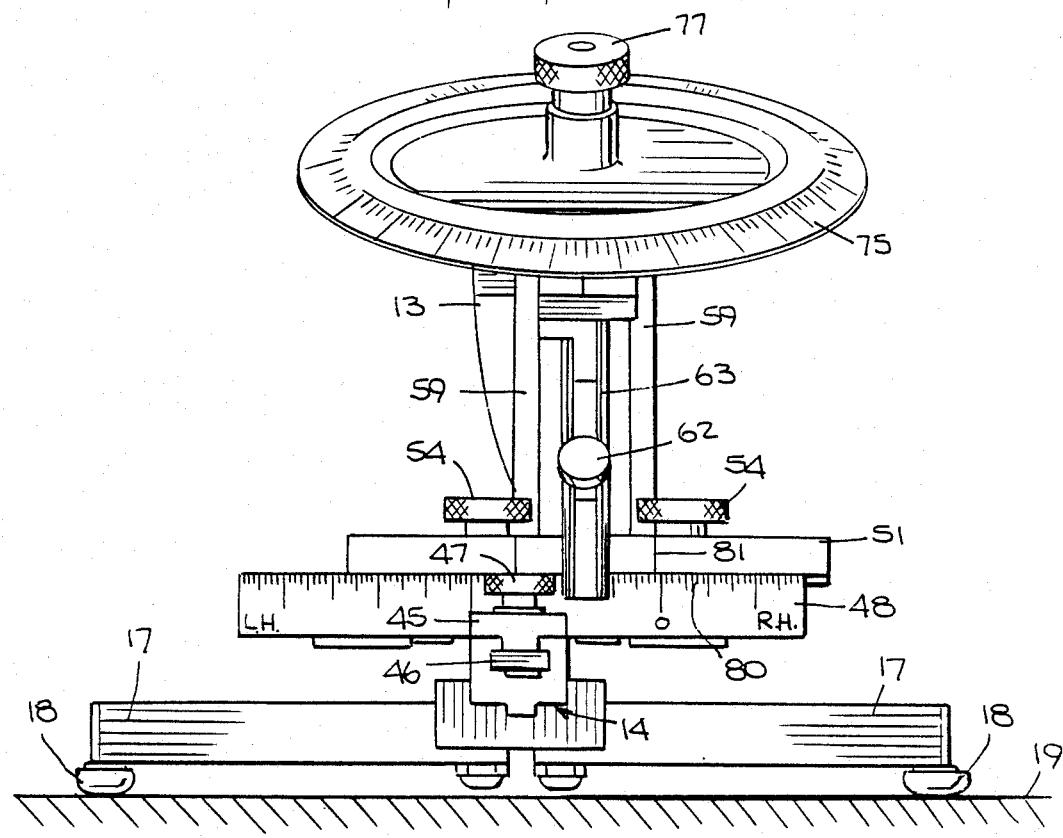
FIG. 7 illustrates a rear view of a means to measure the face progression of a golf club head.
Figure 8:
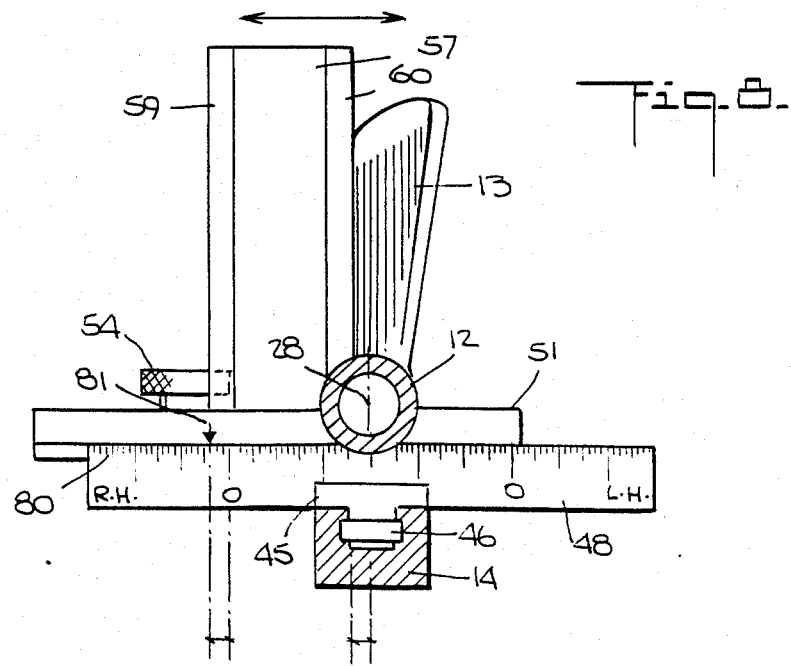
FIG. 8 illustrates a front view of the means to measure the face progression of a golf club head.

Referring to FIGS. 7 and 8, in order to measure the face progression of the club head 13, the clamping screw 47 is loosened and the clamping screws 54 are loosened. This permits the face of a wear plate 59 to be moved into abutting relation with the sole or lower edge of the golf club head 13. At this time, the clamping screws 47, 54 are tightened and the deviation indicated by the indicator 81 on the cross piece 51 relative to the indicia 80 on the cross piece 48 is observed.

All of the measurements described above have been related to a right-hand iron. For a left-hand iron similar measurements may be taken but on the opposite side of the tester 10.

The invention thus provides a tester which is able to establish a fixed axis for any shaft of a matched set of irons in order to quickly and easily obtain the loft, lie and face progression of each club of the matched set. In this respect, the jaws of the holding units will move more or less towards each other depending upon the diameter of the club shaft but in each case will maintain the axis of the shaft on the fixed axis of the tester.

The construction of the tester is such that the tester may be mounted on a horizontal table or on a vertical wall. Further, the construction is such that the tester can be readily dis-assembled and, collapsed in part, for ease of transportation.

What is claimed is:

1. A loft-lie tester for golf clubs comprising
   an elongated frame;
   means for holding a shaft of a golf club on said frame with an axis of the shaft disposed along a fixed axis;
   a first assembly slidably mounted on said frame for measuring the "lie" of a head of a golf club held on said frame; and
   a second assembly mounted on said first assembly for measuring the "loft" of the head of the golf club held on said frame.

2. A loft-lie tester as set forth in claim 1 wherein said means includes a pair of holding units, each unit having mounting blocks for holding said golf club shaft in rotatable manner on said fixed axis.

3. A loft-lie tester as set forth in claim 2 which further comprises a clamping means on said frame for clamping said golf club shaft along said fixed axis against rotation.

4. A loft-lie tester as set forth in claim 1 wherein said first assembly includes a block pivotally mounted about an axis transverse to said fixed axis, said block having a flat surface for abutting a sole of said golf club head tangentially at a centerline of a face of the golf club head, and a first scale means for measuring the angle between said flat surface and said fixed axis as the "lie" of the golf club head.

5. A loft-lie tester as set forth in claim 4 wherein said first assembly includes a pair of wear plates removably secured to said body on opposite sides and in co-planar relation with said flat surface thereon.

6. A loft-lie tester as set forth in claim 4 wherein said first assembly includes an arm extending from said block for movement therewith and said first scale means includes a stationary transparent scale and an indicator mounted on said arm to move along said scale to indicate an angular position of said flat surface relative to said fixed axis.

7. A loft-lie tester as set forth in claim 6 wherein said first assembly includes means for releasably locking said block in a fixed angular position relative to said fixed axis.

8. A loft-lie tester as set forth in claim 4 wherein said first assembly includes a first slide assembly slidably mounted on said frame for movement parallel to said fixed axis and having said block pivotally mounted thereon.

9. A loft-lie tester as set forth in claim 8 wherein said first assembly includes a second slide assembly slidably mounted on said first slide assembly for movement transverse to said fixed axis with said block pivotally mounted thereon to permit abutment of said golf club head against a side of said block and second scale means to measure the distance between said side of said block and said fixed axis as a measure of the "face progression" of the club head.

10. A loft-lie tester as set forth in claim 9 wherein said second scale means includes indicia on said first slide assembly and an indicator on said second slide assembly in alignment with said side of said block, said indicia having a zero position corresponding to said side being aligned with said fixed axis.

11. A loft-lie tester as set forth in claim 4 wherein said second assembly includes a rotatable shaft, a pair of plates mounted on said shaft in longitudinally spaced parallel relation and in perpendicular relation to said shaft, each said plate having an edge for abutting the face of said club head and a second scale means to measure the angular movement of said shaft from a position with said plate edges in a plane parallel with said fixed axis to a position with said plate edges abutting the club head face in parallel relation as the "loft" of the golf club head.

12. A loft-lie tester as set forth in claim 11 wherein said second scale means of said second assembly includes a circular disc secured to said shaft for rotation therewith and having angular indicia thereon and an indicator on said first assembly in alignment with said shaft.

13. A tester for golf clubs comprising
an elongated frame;
means for selectively holding each golf club shaft of a set of matched irons on said frame with an axis of the shaft disposed on a common fixed axis;
a first assembly slidable mounted on said frame for measuring the "lie" of a head of said golf club held on said frame on said fixed axis; and
a second assembly mounted on said first assembly for measuring the "loft" of the head of the golf club held on said frame on said fixed axis.

14. A tester as set forth in claim 13 wherein said first assembly includes a block pivotally mounted about an axis transverse to said fixed axis, said block having a flat surface for abutting a sole of said golf club head tangentially at a centerline of a face of the golf club head, and a first scale means for measuring the angle between said flat surface and said fixed axis as the "lie" of the golf club head.

15. A tester as set forth in claim 14 wherein said first assembly further includes an arm extending from said block for movement therewith and said first scale means includes a stationary transparent scale and an indicator mounted on said arm to move along said scale to indicate an angular position of said flat surface relative to said fixed axis.

16. A tester as set forth in claim 15 wherein said first assembly further includes means for releasably locking said block in a fixed angular position relative to said fixed axis.

17. A tester as set forth in claim 14 wherein said first assembly includes a first slide assembly slidably mounted on said frame for movement parallel to said fixed axis and having said block pivotally mounted thereon.

18. A tester as set forth in claim 17 wherein said second assembly includes a second slide assembly slidably mounted on said first slide assembly for movement transverse to said fixed axis with said block pivotally mounted thereon to permit abutment of said golf club head against a side of said block and second scale means to measure the distance between said side of said block and said fixed axis as a measure of the "face progression" of the club head.

19. A tester as set forth in claim 18 wherein said second scale means includes indicia on said first slide assembly and an indicator on said second slide assembly in alignment with said side of said block, said indicia having a zero position corresponding to said side being aligned with said fixed axis.

20. A tester as set forth in claim 18 wherein said second assembly includes a rotatable shaft, a pair of plates mounted on said shaft in longitudinally spaced parallel relation and in perpendicular relation to said shaft, each said plate having an edge for abutting the face of said club head and a third scale means to measure the angular movement of said shaft from a position with said plate edges in a plane parallel with said fixed axis to a position with said plate edges abutting the club head face in parallel relation as the "loft" of the golf club head.

21. A tester as set forth in claim 20 wherein said third scale means includes a circular disc secured to said shaft for rotation therewith and having angular indicia thereon and an indicator on said assembly in alignment with said shaft.

22. A loft-lie tester for a matched set of golf clubs comprising
an elongated frame;
a pair of leg units mounted on said frame, each leg unit including a pair of legs movably between a retracted position parallel to said frame and an extended position perpendicular to said frame;
a pair of holding units slidably mounted on said frame, each said holding unit having mounting blocks for selectively holding each golf club shaft of a matched set of irons in a rotatable manner about a common fixed axis;
a first assembly slidably, mounted on said frame for measuring the "lie" of a head of said golf club held on said frame; and
a second assembly mounted on said first assembly for measuring the "loft" of the head of the golf club held in said frame.

23. A tester as set forth in claim 22 which further comprises a clamping means on said frame for clamping a selected golf club shaft along said fixed axis against rotation.

24. A tester as set forth in claim 22 wherein each holding unit includes a pair of jaws disposed in facing relation and spring means biasing said jaws towards each other to hold said selected golf shaft therebetween with an axis of the golf shaft coincident with said fixed axis.

25. A tester as set forth in claim 24 wherein, each jaw defines a right-angled recess for receiving a golf club shaft in two-point contact relation.

* * * * *

UNITED STATES PATENT AND TRADEMARK OFFICE
CERTIFICATE OF CORRECTION

PATENT NO. : 4,858,332

DATED : August 22, 1989

INVENTOR(S) : FRANK THOMAS

It is certified that error appears in the above-identified patent and that said Letters Patent is hereby corrected as shown below:

```
Column 1, line 14 cancel "of" (first occurrence)
Column 1, line 39 before "have" insert -and-
     Line 58 change "With" to -with-
Column 2, line 9 cancel "1D"
Column 3, line 15 change "While" to -while-
Column 5, line 43 change "Of" to -of-
     Line 65 change "On" to -on-
Column 6, line 35 after "abutting" insert -a-
Column 7, line 18 change "plates" to -plate-
Column 9, line 40 change "slidable" to -slidably-
```

Signed and Sealed this

Twenty-sixth Day of June, 1990

*Attest:*

HARRY F. MANBECK, JR.

*Attesting Officer*   *Commissioner of Patents and Trademarks*